United States Patent [19]

Miyaki

[11] Patent Number: 4,947,982
[45] Date of Patent: Aug. 14, 1990

[54] DEVICE FOR AUTOMATICALLY SUPPLYING SCREWS

[75] Inventor: Yukio Miyaki, Kyoto, Japan

[73] Assignee: Sharp Kabushiki Kaisha, Osaka, Japan

[21] Appl. No.: 810,845

[22] Filed: Dec. 20, 1985

Related U.S. Application Data

[63] Continuation of Ser. No. 562,480, Dec. 19, 1983, abandoned.

[30] Foreign Application Priority Data

Dec. 23, 1982 [JP] Japan ................................ 57-232220

[51] Int. Cl.⁵ .............................................. B65G 27/00
[52] U.S. Cl. .................................... 198/391; 198/380; 198/396
[58] Field of Search ............... 198/380, 389, 391, 396, 198/398

[56] References Cited

U.S. PATENT DOCUMENTS

| | | | |
|---|---|---|---|
| 2,377,431 | 6/1945 | Lakso | 198/389 X |
| 2,904,162 | 9/1959 | Simer | 198/391 X |
| 3,012,651 | 12/1961 | Hawkes | 198/380 |
| 3,174,614 | 3/1965 | Ponsen | 198/398 X |
| 3,307,678 | 3/1967 | McCollough et al. | 198/380 |
| 3,521,735 | 7/1970 | Gallatin | 198/389 |
| 3,563,361 | 2/1971 | Piroutek | 198/380 X |
| 3,578,142 | 5/1971 | Burgess | 198/391 X |
| 4,440,286 | 4/1984 | Saxon | 198/389 X |
| 4,457,434 | 7/1984 | Brown et al. | 198/380 X |

FOREIGN PATENT DOCUMENTS 959359 3/1957 Fed. Rep. of Germany ...... 198/396

Primary Examiner—Robert J. Spar
Assistant Examiner—Cheryl L. Gastineau
Attorney, Agent, or Firm—Birch, Stewart, Kolasch & Birch

[57] ABSTRACT

In a device for automatically supplying mechanical fasteners such as screws, bolts, rivets and the like, there is provided a conveyance passage for conveying the fasteners in a crowded manner, a conveyance plate downwardly receiving the fasteners dropped out of the conveyance passage at the delivering end and conveying the same to a delivery position, holes provided through the conveyance plate for receiving the fasteners in mutual alignment, a device for removing fasteners not inserted in the holes of the conveyance plate, and a device for delivering fasteners inserted in the holes out of these holes at the delivery position.

7 Claims, 2 Drawing Sheets

DEVICE FOR AUTOMATICALLY SUPPLYING SCREWS

This application is a continuation of application Ser. No. 562,480 filed on Dec. 19, 1983, now abandoned.

BACKGROUND OF THE INVENTION

This invention relates to an automatic supplying device of mechanical fasteners such as screws, bolts, rivets and the like.

Various types of devices have been heretofore known for automatically supplying mechanical fasteners such as screws, bolts, rivets, pins and the like (hereinafter termed screws) to desired positions. For instance, a hopper-vibrator type device has a fan-shaped comb vibrator that vibrates vertically in a hopper for delivering screws in a mutually aligned state with the heads held upward. A vibrating hopper type device delivers screws in such an aligned state with heads held upward under the effect of the vibrating hopper. Otherwise, a feeder vibrating type device utilizes a circular or rectilinear parts feeder, while a pipe feeder type device supplies screws to desired positions through pipes, and a suction delivery type device delivers the aligned screws in a vacuum-sucking manner.

However, in order to maintain the screws in a mutually aligned state with the heads held upward as described above in all of these devices, the following relation must be ordinarily maintained between the diameter D of the head and the length I of the screws.

$$I \geqq 1.3 D$$

Unless the above described condition is satisfied, the realization of the head-upward alignment of screws becomes difficult because of clogging caused at the comb-shaped vibrator in the hopper or in the parts feeder due to the irregular orientation of the screws. In the pipe feeder type device, the conveyance of screws becomes difficult because of clogging in the pipe caused by the irregular orientation. Even in a case where the condition of $I \geqq 1.3 D$ is satisfied, screws having flat heads or flanged heads are easily brought into a state where the heads overlap with each other after the screws have been mutually aligned with the heads held upward, thus causing various problems in the conveyance or delivery of the screws.

SUMMARY OF THE INVENTION

The object of the present invention is to provide a device for automatically supplying screws and the like, wherein the above described difficulties of the conventional devices can be substantially eliminated, and the conveyance of screws and the like to desired positions can be assured regardless of the kind and length thereof.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to the present invention there is provided a device for automatically supplying screws and the like, which comprises a conveyance passage for conveying a number of screws in a crowded manner, a conveyance plate provided to downwardly receive said screws dropped out of the conveyance passage at the delivery end thereof and to convey the same to a delivery position, insert holes provided in mutual alignment through said conveyance plate, means for removing screws not inserted in said holes out of the conveyance plate, and means for delivering said screws out of the inserting holes at said delivering position.

According to the invention, a wide variety of screws and the like can be supplied automatically to a desired position without being restricted to the kind and length of the screws and the like. Furthermore, a conveyance plate having screw inserting holes is utilized, and the screws and the like are conveyed while these are inserted in the holes aligning with each other. As a consequence, the clogging caused by overlapping of the screws and the like can be eliminated completely, and the screws and the like can be supplied to a desired position without fail.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 14 is a plan view showing a device for automatically supplying screws and the like according to a preferred embodiment of the present invention;

DETAILED DESCRIPTION OF THE INVENTION

Figure 2:
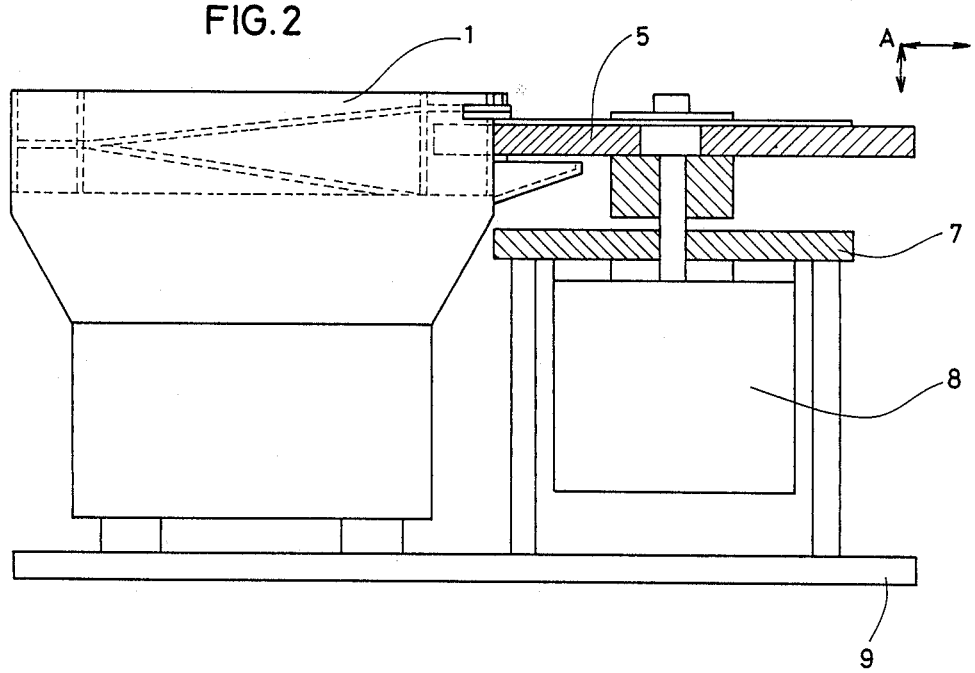
FIG. 2 is a profile view of the embodiment shown in FIG. 1.
Figure 3:
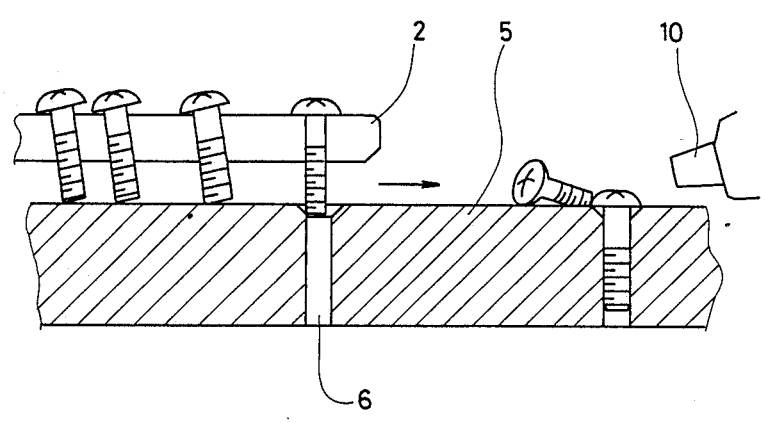
FIG. 3 is a diagram useful for explaining the embodiment.

An automatic supplying device for screws and the like, which constitutes a preferred embodiment of the present invention will now be described in detail with reference to FIGS. 1 through 3.

In the embodiment, screws and the like are firstly supplied to the bottom of a parts feeder 1 of a dish shape, which is vibrated vertically or in its rotating direction by an electromagnetic vibrating device (not shown). By the effect of the vibration of the parts feeder 1, the screws supplied therein are lifted upward as shown by arrow marks along a helical passage formed circumferentially of the dish-shaped portion of the parts feeder. The screws lifted to the highest portion of the helical passage are then shifted from the dish-shaped portion to a transfer plate 2 provided in the parts feeder 1, and the lower portions of the screws are inserted into an aligning groove 3 formed in the transfer plate 2 with the heads thereof held upward. The transfer plate 2 is secured by bolts 4 to a side edge of the parts feeder 1 to be vibrated therewith. The aligning groove 3 of the transfer plate 2 has a width smaller than the diameter of the heads but larger than the diameter of the lower portions of the screws. Thus when the screws move along the transfer plate 2 in a crowded state, the lower portions of the screws fall into the aligning groove 3 while the head portions of the screws are held upward by the side edges of the groove 3.

In alignment with the parts feeder 1, there is provided a rotatable conveyance plate 5 extending between the transfer plate 2 and the delivery position. A number of screw inserting holes 6 are provided in a circumferential portion of the conveyance plate 5. The plate 5 is directly coupled with a motor 8 mounted on a base plate 7 to be thereby rotated. The base portion of the parts feeder 1 and the base plate 7 for the motor 8 are interconnected by a linking base plate 9. The screw inserting holes 6 are arranged just below the aligning groove 3 of the transfer plate 2, which has been formed to be coincide with the locus of the screw inserting holes 6. Furthermore the screws are inserted in the groove 3 of the transfer plate 2 with the lower ends thereof in sliding contact with the upper surface of the rotating conveyance plate 5 as shown in FIG. 3. Therefore, the screws are shifted in accordance with the rotation of the conveyance plate 5 toward the delivery end of the aligning groove 3 while the ends of the screws are engaged with corresponding screw inserting holes 6. At the delivery end of the groove 3, screws are delivered from the transfer plate 2 and inserted into the holes 6 of the conveyance plate 5. While the remaining screws not inserted in the holes 6 are conveyed on the conveyance plate 5, the screws are rotated away from the plate 5 by the wind from a nozzle of an air hose 10 provided at an intermediate position within the conveyance path, and finally returned into the bottom portion of the parts feeder 1.

As a consequence, the screws conveyed in excess of the air hose 10 to the delivery position A are all inserted in the holes 6 of the conveyance plate 5. A detector 11 is provided immediately preceding the delivery position A for detecting the presence or absence of the screws in the holes 6. The detector 11 may be any of known devices such as a light sensor, magnetic sensor and the like. The rotating conveyance plate 5 stops each time the presence of a screw in a hole 6 is detected by the detector 11 and is brought into the delivery position which is indicated by the arrows designated by character A. The screw is removed from the hole by a vacuum nozzle or a magnetic attraction device to be supplied to a desired fastening position. It should be noted that the above described stopping of the rotation of the conveyance plate 5 is not essential at the time of removing the screws. The rotating speed of the plate 5 may be varied in a range of from 1 to 15 turns per minute, and is selected in this embodiment to be approximately 4 turns per minute. Furthermore, the timing of removing screws from the holes 6 is not necessarily in one to one correspondence with that of bringing the screws to the delivery position A. A screw may not be removed from the conveyance plate 5 each time the screw is brought into the delivery position A. In this case, the screws not removed from the plate 5 are further conveyed while they are kept in the holes 6 until the plate 5 is rotated one more turn passing below the transfer plate 2 and the screws are thereby returned to the delivery position A.

Figure 1:
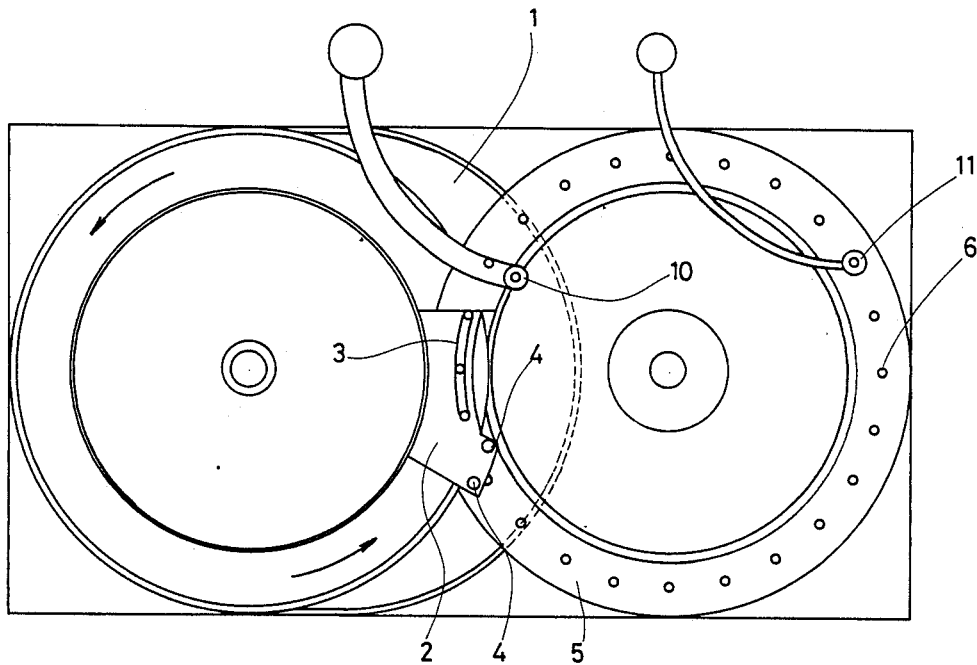

In case where I≧1.3 D, the transfer plate 2 having an aligning groove 3 is utilized as shown in FIG. 1. However, when I<1.3 D, another transfer plate having no aligning groove is utilized instead of the plate 2. The replacement of the transfer plate can be easily realized by releasing the bolts 4. In the latter case where a transfer plate having no groove is utilized, screws placed on the transfer plate are not aligned with the heads held upward, but are conveyed along the plate until the screws are dropped on the conveyance plate 5 at random. Since the length of the screws is comparatively shorter, the screws are easily rotated around on the conveyance plate 5, and successively inserted into the holes 6 in accordance with the probability. Since the diameter of the holes 6 is selected to be larger than that of the threaded portions of the screws and smaller than that of the head portions thereof, only the thread portions of the screws are inserted into the screw inserting holes 6 of the conveyance plate 5.

The device according to the present invention is so constructed that the conveyance plate 5 is easily replaced with a suitable one adapted to the kind of screws to be supplied.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A device for automatically supplying articles comprising:
    a parts feeder;
    a flat transfer plate having a top, a bottom and an edge, said plate including means for supporting said parts on a flat surface;
    a conveyance passage in said flat transfer plate extending completely through said plate from said top to said bottom and opening in said edge said conveyance passage being operatively positioned adjacent to said parts feeder for receiving and conveying a number of articles in a crowded manner, said conveyance passage including a receiving end and a delivery end;
    said means for supporting said parts on a flat surface including supporting said parts not located in said conveyance passage;
    a conveyance plate disposed adjacent to and below said conveyance passage for receiving said articles dropped downwardly of the conveyance passage at the delivery end thereof and conveying the same to a delivery position;
    said conveyance plate including a plurality of apertures disposed therethrough for receiving individual articles;
    removal means for removing articles not inserted in said apertures off of the conveyance plate; and
    discharge means for delivering said articles out of the apertures at a discharge position.

2. A method for automatically supplying articles comprising the steps of:
    supplying a plurality of articles to a flat surface of a transfer plate;
    conveying articles in a crowded state along a conveyance passage in said flat surface extending completely through and from one edge of said plate
    supporing articles on said flat surface while not in contact with said conveyance passage;
    positioning articles in apertures disposed through a conveyance plate;
    holding said articles thus conveyed;
    conveying articles thus inserted and held to a delivering position;
    removing articles not inserted and held during the conveyance to the delivering position; and
    discharging articles brought into said delivering position.

3. A device according to claim 1, wherein said parts feeder is a vibrating feeder for supplying a plurality of articles to said flat transfer plate adjacent to an outer peripheral surface of said parts feeder.

4. A device according to claim 1, wherein said conveyance passage includes two sides spaced relative to each other for holding articles in a crowded manner therebetween.

5. A device according to claim 1, wherein said conveyance plate is a substantially circular plate rotatably mounted for transferring articles from said conveyance plate to said discharge means.

6. A device according to claim 1, wherein said removal means includes an air supply nozzle for imparting movement to said articles to remove said articles from said conveyance plate.

7. A device according to claim 5, wherein said conveyance plate rotates in the range of 1-15 turns per minute.

* * * * *